United States Patent
Atsatt et al.

(10) Patent No.: US 6,233,622 B1
(45) Date of Patent: *May 15, 2001

(54) ADAPTER AND HANDLER FRAMEWORK FOR WEB SERVER EXTENSIONS

(75) Inventors: Bryan P. Atsatt, Redwood City; Steven Robert Loomis, Saratoga; George Robert Turner, Jr., Sunnyvale, all of CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/745,647

(22) Filed: Nov. 12, 1996

(51) Int. Cl.[7] ............................... G06F 9/46; G06F 15/16
(52) U.S. Cl. ............................ 709/315; 709/219
(58) Field of Search ............... 395/200.62, 566, 395/683, 200.33, 200.47, 200.48, 680, 684; 709/221, 222, 228, 250, 315, 219

(56) References Cited

U.S. PATENT DOCUMENTS 4,905,138 * 2/1990 Bourne .................... 364/200
5,367,681 * 11/1994 Foss et al. ................ 395/650
5,379,426 * 1/1995 Foss et al. ................ 395/650
5,721,908 * 2/1998 Lagarde et al. ............ 395/610

OTHER PUBLICATIONS

Fielding et al., "Hypertext Transfer Protocol—HTTP/1.1," Network Working Group Request for Comments: 2068, pp. 1–162, Jan. 1997.*
Eckerson, Wayne; Smack–dab in the Middle; Network World; pp. 1–11, Jun. 1993.*
Blair et al., "The Impact of Distribution on the Object–Oriented Approach to Software Development", IEE/B CS Software Engineering Journal, pp. 2–17, May 1992.*

* cited by examiner

Primary Examiner—Zarni Maung
Assistant Examiner—Gary Scott Fourson
(74) Attorney, Agent, or Firm—Gates & Cooper

(57) ABSTRACT

The present invention discloses an object-oriented programming (OOP) based adapter and handler framework for Web server extensions. The adapter and handler framework provides a generic interface between a Web server program and computer programs external to the Web server program (also known as extensions). The framework isolates the extensions from Web server and operating system dependencies. Moreover, the framework can be easily customized to conform to specific interface protocols.

44 Claims, 4 Drawing Sheets

Microfiche Appendix Included
(1 Microfiche, 32 Pages)

ADAPTER AND HANDLER FRAMEWORK FOR WEB SERVER EXTENSIONS

This patent document includes a microfiche appendix consisting of one microfiche having 32 frames.

BACKGROUND OF THE INVENTION

1. Field of the Invention

The present invention relates generally to a gateway application programming interface (API) between a World Wide Web (WWW) server and one or more computer programs external thereto, and more specifically, to an object-oriented programming (OOP) based adapter and handler framework for Web server extensions.

2. Description of Related Art

A variety of different WWW server systems are known which are used to serve or deliver data between client software or browsers connected to a WWW server on a common network. For example, IBM, Microsoft, and Netscape each market WWW servers. In addition, each of these servers use a variety of mechanisms to add in functionality not in the basic server software and link with other servers containing other information content.

Currently, several standard gateway interfaces exist for interfacing with a WWW server and one or more of these other servers. These interfaces include the Common Gateway Interface (CGI), the Netscape Server API (NSAPI), and the Internet Connection Server API (ICAPI).

However, each of the interfaces shares the same drawback: non-portability. An extension written for one API requires significant re-work to port to another API. Worse yet, an extension written to a given API requires modification if moved to a different operating system (and NSAPI and ICAPI currently exist only on a few platforms).

Thus, a need exists for a way to eliminate or minimize the need to rewrite extensions for each API or operating system. In addition, it would be advantageous to insulate extensions from changes that may occur in the API itself (e.g., new versions of the API). The present invention provides a solution to these and other problems, and offers other advantages over the prior art.

SUMMARY OF THE INVENTION

To overcome the limitations in the prior art described above the present invention discloses an object-oriented programming (OOP) based adapter and handler framework for Web server extensions. The adapter and handler framework provides a generic interface between a Web server program and computer programs external to the Web server program (also known as extensions). The framework isolates the extensions from Web server and operating system dependencies. Moreover, the framework can be easily customized to conform to specific interface protocols.

In the preferred embodiment, the adapter receives a request from a Web server program, and in response to the request the adapter instantiates an IWebRequest subclass as a request object in which it passes a request to the handler, an IWebReply subclass as a reply object in which the handler returns the response, and an IWebRequestHandler subclass as a handler object to perform the actual processing of the request. The adapter then transfers control to the handler, along with the request and reply objects. The handler object accesses the request via the request object, processes the request, and generates a response that is accessed via the reply object. Thereafter, the handler object transfers control back to the adapter, which in turn transfers control back to the Web server program.

These and various other features as well as advantages which characterize the present invention will be apparent upon reading of the following detailed description and review of the associated drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention is an object-oriented framework that provides a generic interface between a Web server program and computer programs external to the Web server program (also known as extensions). The framework isolates the extensions from Web server and operating system dependencies. Moreover, the framework can be easily customized to conform to specific interface protocols.

In the present invention, the framework comprises two components that fit between a Web server program and an external computer program that is located either locally or remotely from the Web server program. The component that connects to the Web server program is referred to as an adapter and the component that connects to the external computer program is referred to as a handler.

System Description

Figure 1:
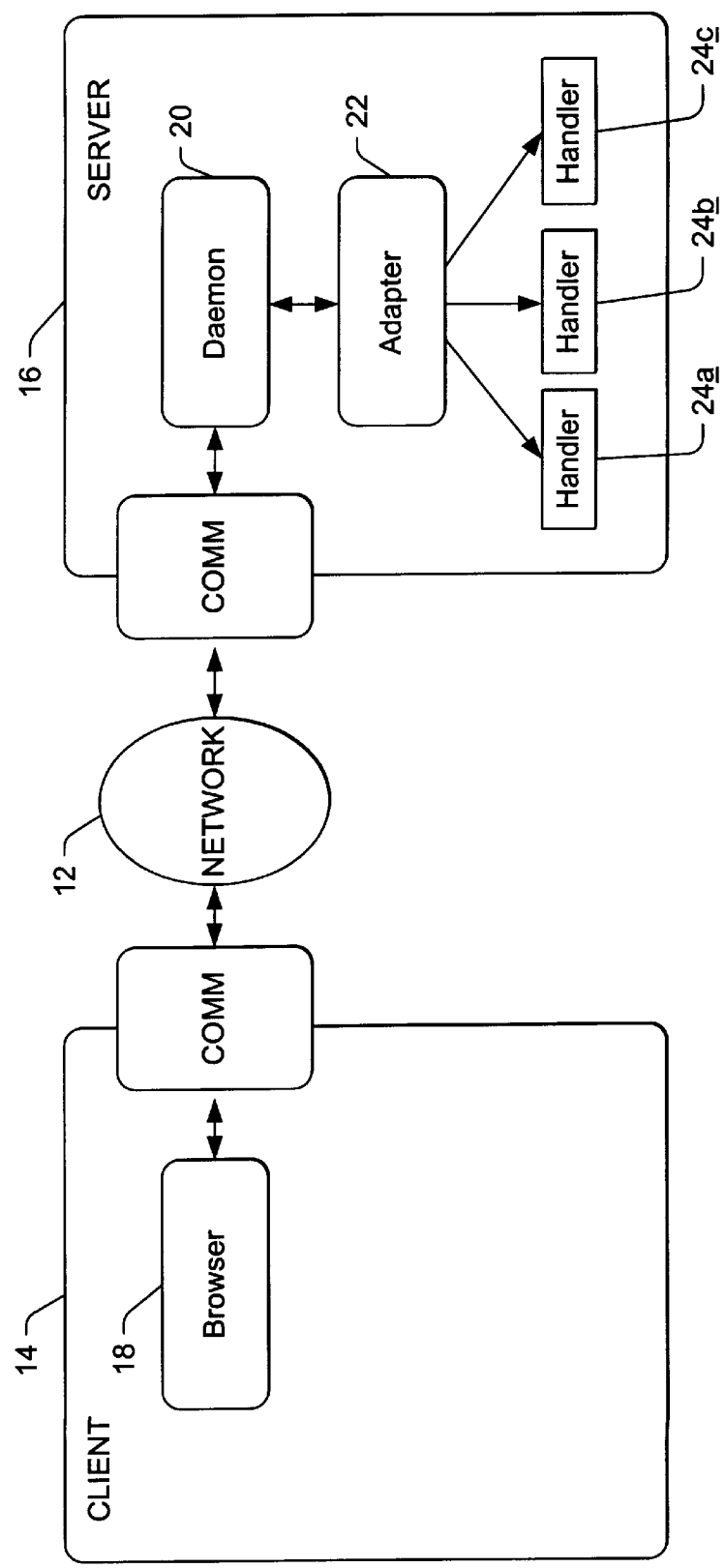
FIG. 1 schematically illustrates the environment of the preferred embodiment of the present invention.

FIG. 1 schematically illustrates the environment of the preferred embodiment of the present invention, and more particularly, illustrates a typical distributed computer system 10 using the Internet or other network 12 to connect client system 14 to server system 16. A typical combination of resources may include clients system 14 that are personal computers or workstations, and server system 16 that are personal computers, workstations, minicomputers, or mainframes. The network 12 may comprise networks such as LANs, WANs, SNA networks, and the Internet.

FIG. 1 also illustrates further details of the interaction between a client system 14 and a server system 16. The client system 14 executes a Web browser 18, such as IBM's Web Explorer, or Netscape's Navigator, or Microsoft's Internet Explorer. The server system 16 executes a Web daemon 20, such as IBM's HTTP Daemon or other WWW daemon.

The user interacts with the Web browser 18 and, at some point, executes an HTTP command via the Web browser 18 that results in the communication with the Web daemon 20. The Web daemon 20 selects an appropriate document in response, for example, an HTML input form, and transmits the document to the Web browser 18 where it is displayed to the user.

The user manipulates the HTML input form via the Web browser 18, by selecting functions and/or entering data into input boxes. When the user invokes a "submit" or "post" command in conjunction with the HTML input form, the data from the HTML input form, along with the command, is transmitted to the Web daemon 20. In the present invention, the submit or post command typically is a hyper-linked item from the HTML input form which comprises a universal resource locator (URL) that invokes an adapter 22 and handler 24. The adapter 22 and handler 24 can be invoked from an HTML form in one of two ways: either by an HTML anchor reference or by an HTML form action.

An HTML anchor reference is typically formatted as follows: "<A HREF=http:// {web-server} / {adapter-name} / [?variable_name=variable_value & . . . ] >". An HTML form action is typically formatted as follows: "<FORM METHOD={method} ACTION=http:// {web-server} / {adapter-name} >".

In both of the above examples, the following parameters are used:
"{web-server}" identifies the Web server 16;
"{adapter-name}" identifies the adapter 22;
"{method}" is either "GET" or "POST", as specified under the HTTP standard;
"[ ?variable_name=variable_value & . . . ]" are parameters that are passed to the adapter 22.

The adapter 22 receives the user input data from the HTML input form. Where {method}="GET", the input data is passed along with the URL and received in the QUERY_STRING variable, a request-specific environment variable. The QUERY_STRING variable holds the input data in the form "[variable_name=variable_value & . . . ]". The adapter 22 extracts the variable_name and variable_value from the QUERY_STRING, associates each variable_value with the corresponding variable_name, and invokes the procedure or function for which it was created using the proper variables.

Where {method}="POST", the input data is received through the standard input (or stdin) file stream. The adapter 22 performs the same extracting, associating, and invoking steps as discussed above with respect to the "GET" method. However, prior to performing these steps, the adapter 22 must first read the stdin file stream into a string variable.

In the present invention, the adapter 22 passes the incoming request to a handler 24 for processing or for communication to external computer programs executing locally or remotely. Thereafter, the handler 24 returns a response to the adapter 22 for communication back to the Web daemon 20. The results from the external computer program are then forwarded from the Web daemon 20 to the Web browser 18 according to standard conventions. In this manner, the adapter 22 and handler 24 support access to computer programs external to the Web daemon 28, such as dynamic document creation programs, database management systems, etc.

In the present invention, the adapter 22 can be designed for most gateway and interface protocols, such as Common Gateway Interface (CGI), Netscape Server Application Programming Interface (NSAPI), and Internet Connection Server Application Programming Interface (ICAPI). However, the handler 24 is the focal point of the framework. Further, multiple handlers 24a–24c can be used with one adapter 22 to handle multiple, different requests. In addition, a single type of handler 24 can be executed on different server systems 16, provided each server system 16 uses a conforming protocol.

Adapter and Handler

Figure 2:
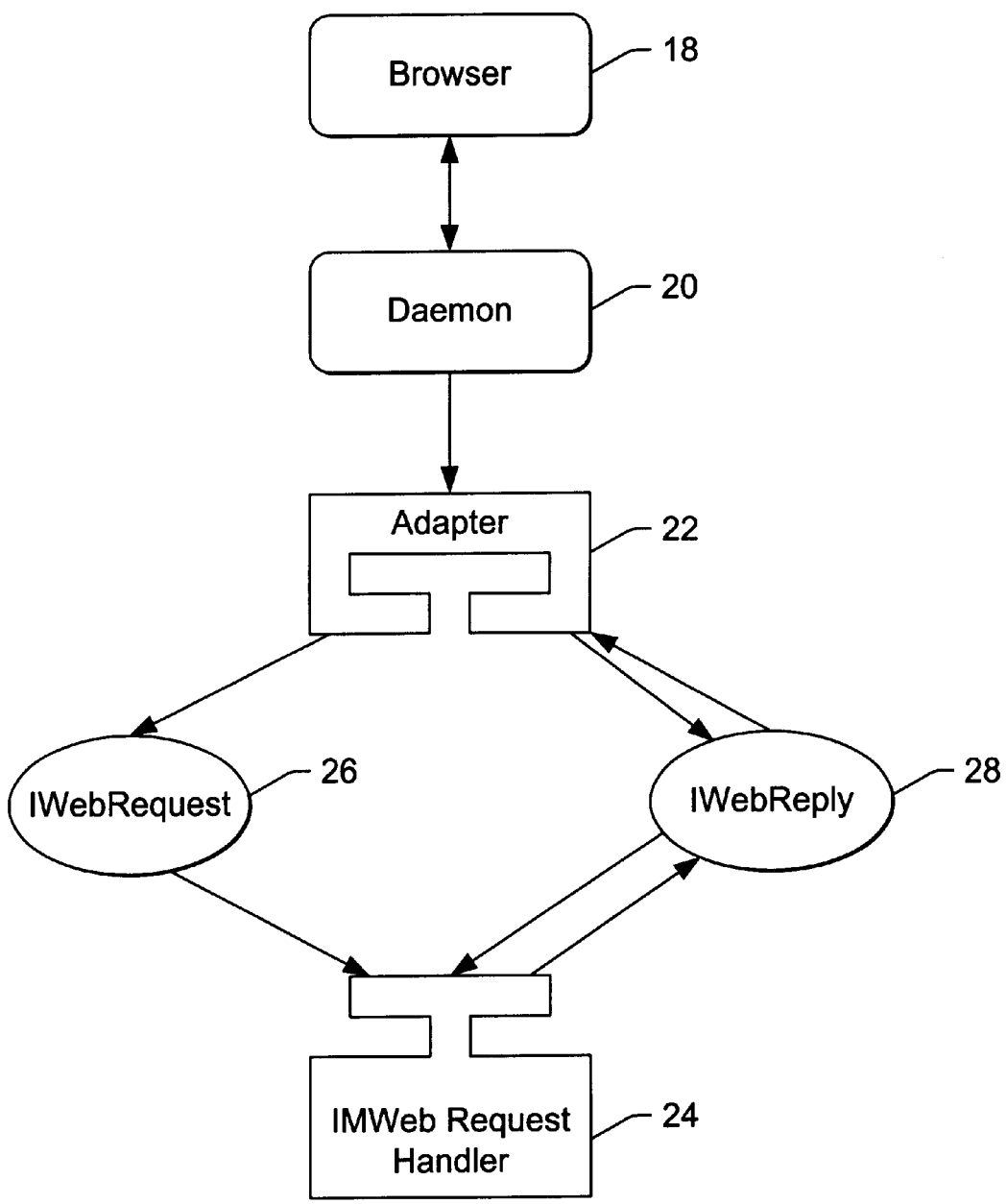
FIG. 2 is a block diagram that illustrates the relationship between the adapter and the handler according to the present invention.

FIG. 2 is a block diagram that illustrates the relationship between the adapter 22 and the handler 24 according to the present invention. In the present invention, the adapter 22 creates a handler 24 from a request handling class to perform the actual processing of the request.

An example of this class is implemented in the preferred embodiment as the IMWebRequestHandler class. The IMWebRequestHandler class, which is described in more detail in Appendices A and B attached hereto, provides a protocol for handling HTTP requests. In addition, the IMWebRequestHandler class contains a handleRequest function:

void handleRequest(IWebRequest& request, IWebReply& reply)= 0;

This function is also described more detail in Appendix A attached hereto. The handleRequest function is overridden by specific instances of handlers 22.

Prior to invoking the handleRequest function, however, the adapter 30 creates a request object 26 from a request class, in which it passes the request to the handler 24, and creates a reply object 28 from a reply class, in which the handler 24 returns its response.

An example of the request class is implemented in the preferred embodiment as the IWebRequest class, and an example of the reply class is implemented in the preferred embodiment as the IWebReply class. Both of these classes are described in more detail in Appendices A and B attached hereto.

The IWebRequest and IWebReply classes provide the templates for defining the behavior for processing HTTP requests and replies. These classes provide the functions and data elements needed to analyze and generate HTTP data streams. In the preferred embodiment, the IMWebRequestHandler subclasses must access the request from an instance of the IWebRequest class, i.e., the request object 26, and must access the reply from an instance of the IWebReply class, i.e., the reply object 28.

The IWebRequest and IWebReply classes are subclassed according to the gateway or interface being used in the adapter 22. For example, CGI, NSAPI, and ICAPI adapters are constructed from different pre-defined subclasses of IWebRequest and IWebReply.

Figure 3:
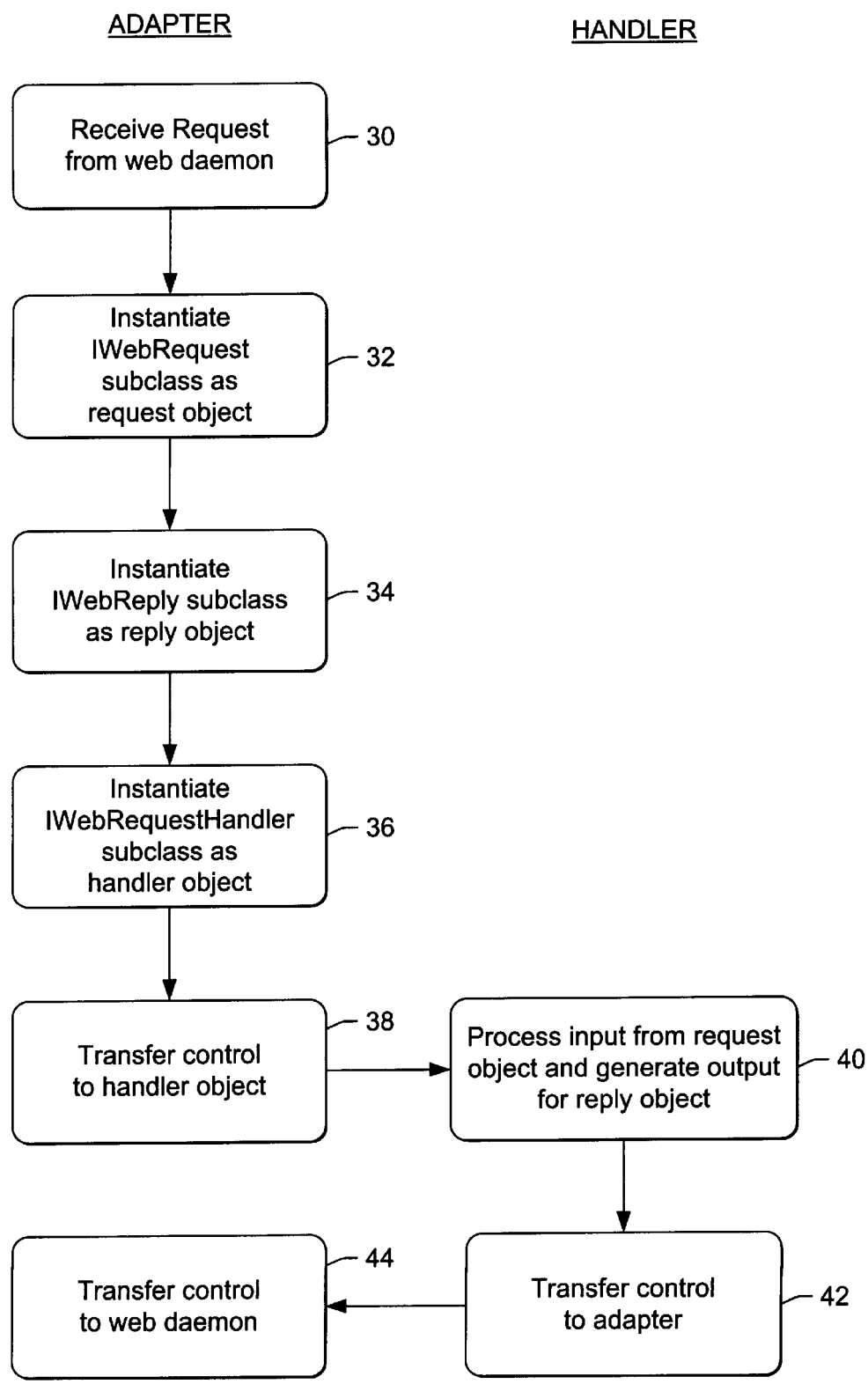
FIG. 3 is a flowchart illustrating an exemplary sequence of steps performed by both the adapter and the handler according to the present invention.

FIG. 3 is a flowchart illustrating the steps performed by the adapter 22 and the handler 24 according to the present invention. The flowchart is divided into two columns labeled "Adapter" and "Handler" to distinguish the functions performed by the adapter 22 from the functions performed by the handler 24. Block 30 represents the adapter 22 receiving a request from the Web daemon 20. Block 32 represents the adapter 22 instantiating the IWebRequest subclass as a request object 26 for accessing request variables, wherein the request object 26 communicates with the Web daemon 20 regarding the request as required. Block 34 represents the adapter 22 instantiating the IWebReply subclass as a reply object 28 for accessing reply variables, wherein the reply object 28 communicates with the Web daemon 20 regarding the response as required. Block 36 represents the adapter 22 instantiating the IWebRequestHandler subclass as a handler 24 object. Block 38 represents the adapter 22 transferring control to the handler 24, along with the request and reply objects 26 and 28. Block 40 represents the handler 24 accessing the request via the request object 26, processing the request, and generating a reply that is accessed via the reply object 28 in response thereto. Block 42 represents the handler 24 transferring control back to the adapter 22 and Block 44 represents the adapter 22 transferring control back to the Web daemon 20. As indicated above, the reply object 28 communicates the reply back to the Web daemon 20 as required.

Figure 4:
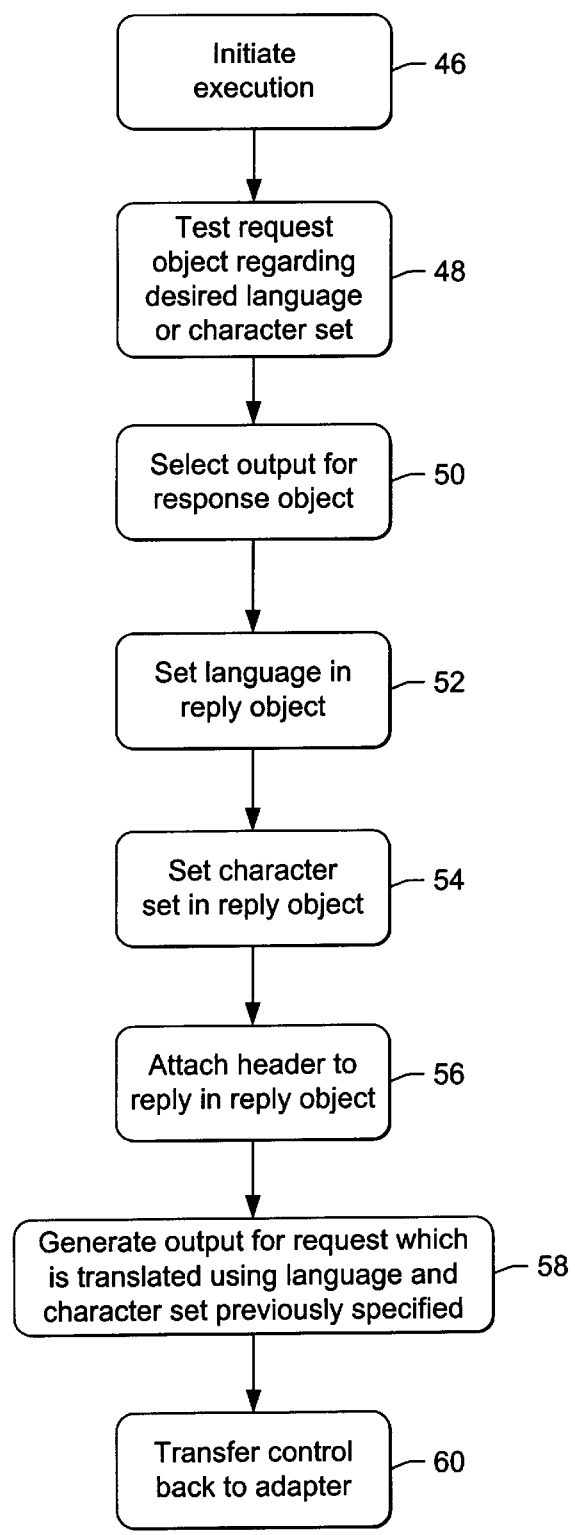
FIG. 4 is a flowchart illustrating an exemplary sequence of steps performed by the handler according to the present invention.

FIG. 4 is a flowchart illustrating an exemplary sequence of steps performed by the handler 24 at Block 40 of FIG. 3 according to the present invention. In this example, the handler 24 provides international text support for documents.

The international text support consists of: (1) functions in the request object 26 to determine what languages and character sets the browser 18 can accept; (2) functions in the reply object 28 to specify the language and character set of the output generated in response to the request; and (3) functions in the reply object 28 to translate characters in the output to the specified character set. Information concerning language and character set support in browsers 18 are defined by the HTTP 1.1 Specification, which is incorporated by reference herein.

In this example, there are two document types: (1) generated documents, such as an order form automatically generated in response to a request; and (2) pre-encoded documents, such as a newspaper article previously selected as the output to a particular response. Each type of document requires slightly different functionality.

Block 46 represents the handler 24 initiating execution by overriding the handleRequest function from the IWebRequestHandle subclass. Further, Block 46 represents the handler 24 receiving pointers to the request object 26 and reply object 28 passed to it by the adapter 22.

Block 48 represents the handler 24 testing the request object 26 to determine whether or not a particular language or character set is "acceptable" to the browser 18. Web browsers 18 can specify a ranked list of languages and character sets that they can support, and this information is accessed via the request object 26. The functions return a "true" indication if the browser 18 accepts the language/character set and return the ranking (zero—first choice). In the event that no language/character set has been specified on the request, these functions return "true" for any language/character set and assign a zero ranking. For character set values, ranking is defined by the appearance order; for language values, ranking is derived from the "quality" values (an estimate of the user's comprehension of that language) as defined in the HTTP/1.1 specification.

Block 50 represents the handler 24 selecting the output for the response and determining if it is acceptable to the browser 16.

For example, if only static text is used to produce the output, then the language is pre-defined by the developer. In another example, if text comes from an archive of localized text, then the handler 24 iterates over accepted languages until it finds localized text in the archive from which to generate output. Finally, if no acceptable language can be found, then an exception condition occurs, and default output is generated.

For pre-encoded documents, the steps performed are almost exactly the same as for generated documents, with some exceptions. For example, there is no need to select the character set, but instead the handler 24 simply determines whether the character set is acceptable.

Block 52 represents the handler 24 setting the language in the reply object 28.

Block 54 represents the handler 24 setting the character set in the reply object 28.

Block 56 represents the handler 25 attaching a header to the reply in the reply object 28. Preferably, when a new header is attached to the reply object 28, a transcoder function is created (using the character set specified by the header) and used for all subsequent generated output (after any filtering is applied).

Block 58 represents the handler 25 generating the output for the request, which is transcoded using the character set previously specified. This output is accessed via the reply object 28.

Finally, Block 60 represents the handler 24 transferring control back to the adapter 22.

Handler Pseudocode Examples

Various pseudocode examples of handlers 24 are described below. These examples rely on functions and classes described in more detail in Appendix A attached hereto.

Following is an example of a handler 24 (IHelloWorld) that returns an HTML document in response to a user request:

```
// Derive the IHelloWorld class from
// the IMWebRequestHandler class
class IHelloWorld : public IMWebRequestHandler
{
public:
void handleRequest ( IWebRequest& request,
        IWebReply& reply);
} ;
// Override the handleRequest function
IHelloWorld::handleRequest(IWebRequest& request,
    IWebReply& reply)
{
// Ensure the request is a GET/POST/HEAD request
request.assertStandardMethod();
// Return a response
reply.write("Hello World ");
}
```

Following is an example of a handler 24 that uses a form to get the user's name. The first page returned simply asks for the user's name, and the second page says hello:

```
// Override the handleRequest function
void IFormSample::handleRequest(IWebRequest& request,
    IWebReply& reply)
{
// Ensure the request is a GET/POST/HEAD
request.assertStandardMethod();
// Instantiate an object to store the name
IString theName;
// Check if a "name" field is present in the request
if (request.query().queryField("name",theName) ==
    false)
{
// A "name" field was not present, so ask for it.
// Instantiate a URL object and store the user input
```

```
IURL actionURL = request.url();
// Remove any query from the user input
actionURL.removeQuery();
// Respond with an HTML input form
reply.write ("<html><head><title>Forms"
        "sample</title></head>"
        "<body><form method=GET action=");
// ... to the identified URL
reply.write(actionURL);
// ... requesting the user's name
reply.write (">"
        "Enter your name: <input name=name><p>"
        "<input type=submit name=OK>"
        "</form></body>"
        "</html>");
}
else
{
// The user told us their name, so say Hi.
// Respond with an HTML document
reply.write("<html>"
        "<head><title>Hello!</title></head>"
        "<body>"
        "<h1>Hello, <b>");
// ... including the user's name
reply.write (theName);
// ... and complete the HTML document
reply.write( "</b>!</h1>"
        "</body></html>");
}
}
```

Following is an example of a handler 24 which randomly redirects the user to one of four predefined Web sites:

```
// Override the handleRequest function
void IRandomRedirector::handleRequest (IWebRequest&
        request, IWebReply& reply)
{
// Instantiate a URL object called "where"
IURL where;
// Randomly select among 4 URLS ...
switch(rand() % 4)
{
case 0: where = "http://www.taligent.com";
        break;
case 1: where = "http://www.ibm.com";
        break;
case 2: where = "http://www.disney.com";
        break;
case 3: where = "http://www.osaka-u.ac.jp";
}
// Respond by redirecting the user to the selected URL
reply.redirect(where);
}
```

Of course, those skilled in the art will recognize that the examples provided above are for illustrative purposes only and do not limit the scope of the present invention.

Adapter Pseudocode Examples

Various pseudocode examples of adapters 22 are described below. These examples also rely on functions and classes described in more detail in Appendices A and B attached hereto.

Following is an example of source code for an adapter 22 conforming to the CGI standard:

```
// Define Adapter
int main ()
{
int result = 0;
// Instantiate objects and transfer control to handler
try
{
ICGIRequest request;
IStandardOutputReply reply;
IHelloWorld handler;
handler.handleRequest (request,reply);
}
// Wait for control to transfer back from handler
catch (...)
{
result = 1; // Indicate that an error occurred.
}
// Return result value
return result;
}
```

In the above example, the adapter instantiates an ICGIRequest, a subclass of IWebRequest that uses CGI environment variables and standard input. The adapter also instantiates an IStandardOutReply, a subclass of IWebReply that writes output to the standard output ("stdout"). Finally, the adapter instantiates an IHelloWorld, a subclass of IWebRequestHandler that process the request and generates the reply.

Similarly, following is an example of source code for an adapter 22 conforming to the NSAPI standard:

```
// Define Adapter
int INSAPI_Hello (void *pb, void *sn, void *rq)
{
int result = 0;
// Instantiate objects and transfer control to handler
try
{
INSAPIRequest request(pb, sn, rq);
INSAPIReply reply(pb, sn, rq);
IHelloWorld handler;
handler.handleRequest (request, reply);
}
// Wait for control to transfer back from handler
catch (...)
{
result = 1; // Indicate that an error occurred.
}
// Return result value
return result;
}
```

Following is an example of source code for an adapter 22 conforming to the ICAPI standard:

```
// Define Adapter
void IICAPI_Hello (unsigned char *handle,
        long *return_code)
{
*return_code = IWebReply::kHTTP_OK;
// Instantiate objects and transfer control to handler
try
{
IICAPIRequest request;
IICAPIReply reply;
IHelloWorld handler;
handler.handleRequest (request, reply);
```

-continued

```
}
// Wait for control to transfer back from handler
catch (...)
{
// Indicate that an error occurred.
*return_code = IWebReply::kHTTP_SERVER_ERROR;
handle = 0;
}
```

Of course, those skilled in the art will recognize that the examples provided above are for illustrative purposes only and do not limit the scope of the present invention.

Alternative Embodiments

The above examples illustrate the simplest form of adapter 22 and the handler 24, in which the handler 24 is statically linked to the adapter 22. Using this method, a new adapter 22 must be created for each type of handler 24.

In the present invention, however, the handler 24 may be dynamically linked to the adapter 22. Consider a handler 24, IDynamicHandler, which retrieves an object reference out of a URL in a user request, uses runtime functionality to instantiate the handler 24 using the object reference, and then passes control to the handler 24.

An example for IDynamicHandler is provided below:

```
// Override the handleRequest function
IDynamicHandler::handleRequest (IWebRequest& request,
        IWebReply& reply)
{
// Ensure the request is a GET/POST/HEAD
request.assertStandardMethod();
// Instantiate an externalized reference object
IString externalizedReference;
// Place holder for the handler reference
IMWebRequestHandler* handler = NIL;
// Look for a "handler" field in the request
if (request.query() .queryField ( "handler",
        externalizedReference ) == false)
{
// The request does not have a "handler" field,
// so create a default handler
handler = new IDefaultHandler;
}
else
{
// The request has a "handler" field,
// so store the object reference ...
IObjectReference reference (externalizedReference);
// and instantiate the handler.
handler = reference.createInstance();
}
// Hand off the request to the handler
handler -> handleRequest(request,reply);
// Clean up - delete the handler when done
delete handler;
}
```

In the above example, a single extension program has been created which dynamically invokes handlers 24 based on the contents of the URL in the user request, or based on a default if none is provided in the user request.

The above example, IDynamicHandler, is easily extended to invoke handlers 24 with persistent state, e.g., by saving the handler state to disk. Such persistent handlers 24 are quite useful for a number of applications, such as caching a client's state, holding connection information for remote databases, etc.

Another variation on handlers 24 would be remote handlers 24 running as a separate process. For example, under CGI, each request is handled by a new process, and the process state must be re-created for each request, thereby resulting in poor performance. However, the adapter 22 could be modified to instantiate a first handler 24, IRemoteHandler, which then forwards the requests to a second handler 24 running as a separate, persistent process.

Further, such remote handlers 24 could be used for load balancing purposes. By pooling a collection of remote handlers 24, with some additional load querying functionality, an adapter 22 can distribute requests across multiple (perhaps replicated) remote handlers 24.

Conclusion

This concludes the description of the preferred embodiment of the invention. The following describes some alternative embodiments for accomplishing the present invention.

In alternative embodiments, other types of computers, such as a mainframe, minicomputer, or personal computer, could be used to implement the present invention.

In addition, the present invention is not limited by a specific programming language. The server adapter and request handler may be implemented in other programming languages, for example, C, C++, PERL, JAVA, Cobol, etc.

Moreover, input and output data streams in formats other than HTTP and HTML are within the scope of the invention.

In summary, the present invention discloses an object-oriented programming (OOP) based adapter and handler framework for Web server extensions. The adapter and handler framework provides a generic interface between a Web server program and computer programs external to the Web server program (also known as extensions). The framework isolates the extensions from Web server and operating system dependencies. Moreover, the framework can be easily customized to conform to specific interface protocols.

In the preferred embodiment, the adapter receives a request from a Web server program, and in response to the request the adapter instantiates an IWebRequest subclass as a request object in which it passes a request to the handler, an IWebReply subclass as a reply object in which the handler returns the response, and an IWebRequestHandler subclass as a handler object to perform the actual processing of the request. The adapter then transfers control to the handler, along with the request and reply objects. The handler object accesses the request via the request object, processes the request, and generates a response that is accessed via the reply object. Thereafter, the handler object transfers control back to the adapter, which in turn transfers control back to the Web server program.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

APPENDIX A
1

Class and Member Information

| Method Name | IMWebRequestHandler::handleRequest |
|---|---|
| Signatures | virtual void handleRequest (IWebRequest& request, IWebReply& reply) = 0 |
| Purpose | This function is called to output data in response to a client request. |
| Special Parameters & Return Values | "request" contains the client's request, and data should be written to "reply". |

| Class Name | IURL |
|---|---|
| Purpose | A wrapper for generic Uniform Resource Locator strings of the form:<br>[scheme ":"] ["//" netloc] ["/" path] [";" parameters] ["?" query] ["#" fragment]<br>Instances of this class can represent either absolute or relative URLs - absolute URLs have the 'scheme' portion (e.g. 'http:') and relative URLs do not.<br><br>This class is based on rfc1808 which can be found at:<br>"http://www.w3.org/pub/WWW/Addressing/rfc1808.txt"<br><br>For a good source of web information, see:<br>"http://www.w3.org/pub/WWW/" |
| Subclassing | This class is not intended to be subclassed. |

APPENDIX A
2

| Related Classes | IPathname and IString are classes that users of IURL should understand. |
|---|---|
| Other | o Not Multithread or static safe. |

| Method Name | IURL::setFragment |
|---|---|
| Signatures | virtual void setFragment (const IString& fragment, EEncoding = kEncode) |
| Purpose | Sets the fragment portion of the URL. |
| Special Parameters & Return Values | By default, "Fragment" is encoded. Passing kDoNotEncode for the second parameter will disable encoding of the fragment string. |

| Method Name | IURL::removeFragment |
|---|---|
| Signatures | virtual bool removeFragment () |
| Purpose | Remove the fragment |
| Special Parameters & Return Values | Returns false if the fragment was already empty. |

| Method Name | IURL::setNetLocation |
|---|---|
| Signatures | virtual void setNetLocation (const IString& netLocation) |
| Purpose | Sets the network location and login information of the URL. For instance, "monkey:8080" refers to DNS host "monkey", port 8080. |

APPENDIX A
3

| Other | o Throws exception kInvalidParameter if netLocation contains an illegal character. |
|---|---|
| Special Parameters & Return Values | netLocation must contain only legal characters for a net location, as per RFC 1808 |

| Method Name | IURL::removeNetLocation |
|---|---|
| Signatures | virtual void removeNetLocation () |
| Purpose | Removes the Net Location. |

| Method Name | IURL::setPath |
|---|---|
| Signatures | virtual void setPath (const IPathName& path, EPathKind kind, EEncoding = kEncode)<br>virtual void setPath (const IString& path) |
| Purpose | 1. Sets the path of the URL to the specified path.<br>2. Sets the path based on the string "path". |
| Other | o First variant throws exception kInvalidParameter if a path segment i not encodable as ISO8859-1 |
| Special Parameters & Return Values | 1. kind specifies whether the path represents a directory or a file. By default, each segment of "path" is encoded. If the path segments are already encoded, pass "kDoNotEncode" as the third parameter. |

| Method Name | IURL::removePath |
|---|---|

APPENDIX A
4

| | |
|---|---|
| Signatures | virtual bool removePath () |
| Purpose | Removes the path |
| Special Parameters & Return Values | Returns false if the path was already empty. |

| | |
|---|---|
| Method Name | IURL::setQuery |
| Signatures | virtual void setQuery (const IString& query, EEncoding = kEncode) |
| Purpose | Replaces the entire query string with "query". |
| Special Parameters & Return Values | By default, "query" is encoded in accordance with RFC1808. If kDoNotEncode is passed as the second parameter, then "query" is used as-is.<br>For instance, to manually set form data key-value pairs, you can call<br>   setQuery("name=Foo&bar=Baz",IURL::kDoNotEncode); |

| | |
|---|---|
| Method Name | IURL::setQueryField |
| Signatures | virtual void setQueryField (const IString& name, const IString& value) |
| Purpose | Sets the query field "name" to the value "value". |
| Special Parameters & Return Values | Both the "name" and "value" parameters can contain any string, they will be encoded into proper URL format. |

| | |
|---|---|
| Method Name | IURL::removeQuery |

APPENDIX A
5

| Signatures | virtual bool removeQuery () |
|---|---|
| Purpose | Remove the entire query string. |
| Special Parameters & Return Values | Returns false if the query string was already empty. |

| Method Name | IURL::removeQueryField |
|---|---|
| Signatures | virtual bool removeQueryField (const IString& name) |
| Purpose | Removes the specified field from the query string. |
| Special Parameters & Return Values | Returns false if the field was not present in the query string. |

| Method Name | IURL::queryFieldMember |
|---|---|
| Signatures | virtual bool queryFieldMember (const IString& name) const |
| Purpose | Returns true if the specified field is present in the URL. |

| Method Name | IURL::scheme |
|---|---|
| Signatures | virtual bool scheme (IString& fillinScheme) const |
| Purpose | Sets fillinScheme to the scheme. Returns false if the scheme is empty. |

APPENDIX A
6

| Method Name | IURL::setScheme |
|---|---|
| Signatures | virtual void setScheme (const IString& scheme) const |
| Purpose | Set the scheme of the given URL. For instance, "http". |
| Other | o Throws exception kInvalidParameter if the scheme contains illegal characters; |
| Special Parameters & Return Values | "scheme" must comply to RFC 1808 |

| Method Name | IURL::removeScheme |
|---|---|
| Signatures | virtual void removeScheme () |
| Purpose | Removes the scheme from the URL. |

| Method Name | IURL::removeAllParameters |
|---|---|
| Signatures | virtual bool removeAllParameters () |
| Purpose | Remove all URL parameters. |
| Other | See RFC 1808 for a definition of URL parameters. |
| Special Parameters & Return Values | Returns false if there were no parameters present. |

APPENDIX A
7

| | |
|---|---|
| | |

| Method Name | IURL::queryField |
|---|---|
| Signatures | virtual bool queryField (const IString& name, IString& fillinValue) const<br>virtual bool queryField (int index, IString& fillinName, IString& fillinValue) const |
| Purpose | Returns the value of a certain query field |
| Special Parameters & Return Values | 1. Sets fillinValue to the value of the field with the specified name<br>2. Sets fillinValue to the value of the specified index, where "index" is in the range 0..queryFieldCount()-1<br>Returns false if the specified field is not present. |

| Method Name | IURL::path |
|---|---|
| Signatures | virtual bool path (IPathName& fillinPath, EPathKind& fillinKind, EDecoding = kDecode<br>virtual bool path (IString& fillinPath) |
| Purpose | Returns the path of the URL in fillinPath, either as a string or as an IPathName.<br>Returns false if the path is not set. |
| Special Parameters & Return Values | In the first variant, fillinKind is set depending on whether the URL is directory or file path. By default, each segment of the IPathName is decoded. If kDoNotDecode is passed as the third parameter, then the pathname is not decoded. |

APPENDIX A
8

| Method Name | IURL::parameter |
|---|---|
| Signatures | virtual bool parameter (int index, IString& fillinParameter) const |
| Purpose | Returns the parameter with the given index. |
| Special Parameters & Return Values | index must be in the range 0..parameterCount()-1<br>Returns false if index is out of range. |

| Method Name | IURL::IURL |
|---|---|
| Signatures | 1. IURL ()<br>2. IURL (const IString& scheme, const IString& schemeData)<br>3. IURL (const IString& url)<br>4. IURL (const IURL& right)<br>5. IURL (const IURL& absolute, const IURL& relative) |
| Purpose | 5. Construct an absolute URL from an absolute and a relative URL. |
| Other | o Throws exception kInvalidParameter if scheme contains invalid characters<br>5. o Throws exception if absolute.isAbsolute() == false or relative.isAbsolute() == true... |

| Method Name | IURL::operator const IString<br>IURL::get |
|---|---|
| Signatures | virtual operator const IString& () const<br>virtual bool get(IString& fillinURL) const |
| Purpose | Returns the full URL. The second variant returns false if the URL is empty. |

APPENDIX A
9

| | |
|---|---|

| Method Name | IURL::isRelativePath |
|---|---|
| Signatures | virtual bool isRelativePath () const |
| Purpose | Returns true if the path is relative (i.e. the path begins with a '/') |

| Method Name | IURL::isFilePath |
|---|---|
| Signatures | virtual bool isFilePath () const |
| Purpose | Returns true if the path is a file (i.e. it does not end with a '/') |

| Method Name | IURL::isAbsolute |
|---|---|
| Signatures | virtual bool isAbsolute () const |
| Purpose | This function returns true when the URL is absolute (scheme(...) == true), false otherwise... |

| Method Name | IURL::appendParameter |
|---|---|
| Signatures | virtual void appendParameter (const IString& parameter) |
| Purpose | Adds the specified parameter string to the URL as a seperate |

APPENDIX A
10

|  | parameter. |
|---|---|

| Method Name | IURL::assertSchemeValid |
|---|---|
| Signatures | void assertSchemeValid (const IString& scheme) const |
| Purpose | Assert that the scheme is valid. |
| Other | o Throws exception ??? if the scheme is not present. |

| Method Name | IURL::encode... <br> IURL::decode... |
|---|---|
| Signatures | virtual void encodeNetLocation (const IString& in, IString& out) const <br> virtual void encodePath (const IPathName& in, IString& out, IURL::EPathKind kind) const <br> virtual void encodePathSegment (const IString& in, IString& out) const <br> virtual void encodeParameter (const IString& in, IString& out) const <br> virtual void encodeQueryField (const IString& in, IString& out) const <br> virtual void encodeFragment (const IString& in, IString& out) const; <br> virtual void decodeNetLocation (const IString& in, IString& out) const <br> virtual void decodePath (const IString& in, IPathName& out, IURL::EPathKind& kind) const <br> virtual void decodePathSegment (const IString& in, IString& out) const <br> virtual void decodeParameter (const IString& in, IString& out) const <br> virtual void decodeQueryField (const IString& in, IString& out) const; <br> virtual void decodeFragment (const IString& in, IString& out) const; |

APPENDIX A
11

| | |
|---|---|
| Purpose | These functions encode/decode the specified components according to RFC1808 |

| Class Name | IWebHeader |
|---|---|
| Purpose | IWebHeader defines an HTTP header. The IWebReply writes an IWebHeader to the output stream before any other data is written. The header is required by HTTP. The header defines such things as the type of data contained in the stream and the character set used etc. For a complete description of HTTP see:<br>"http://www.w3.org/pub/WWW/Protocols/HTTP/1.1/spec.html" |
| Subclassing | IWebHeader is not intended to be subclassed. |
| Related Classes | To fully use this class developers should have an understanding of IString, ILanguageName, ICharacterSetName and IWebReply. |
| Other | o Not Multithread or static safe. |

| Method Name | IWebHeader::IWebHeader |
|---|---|
| Signatures | 1. IWebHeader (ILongLong contentLength,const IString& contentType = "text/html")<br>2. IWebHeader (const IString& contentType = "text/html",bool autoSize = false)<br>3. IWebHeader (const IWebHeader& right) |
| Purpose | 1. Use this constructor when the length of the data is known. Pass in the contentLength and the content type.<br>2. Use this constructor when the length of the data is not known. Pass 'true' for autoSize if you want the contentLength to be automatically |

APPENDIX A
12

| | calculated for you (this will involve buffering all data before it is sent). |

| Method Name | IWebHeader::write |
|---|---|
| Signatures | virtual void write (IWebReply& reply) const |
| Purpose | Writes the header into the given webReply |
| Other | This function is intended to be called by the framework only. |

| Method Name | IWebHeader::setLanguage |
|---|---|
| Signatures | virtual void setLanguage (const ILanguageName& language) |
| Purpose | Specify the Content-Language of the output document. |

| Method Name | IWebHeader::setCharacterSet |
|---|---|
| Signatures | virtual void setCharacterSet (const ICharacterSetName& charSet)<br>virtual void setCharacterSet (const ILanguageName& language, const IWebRequest& request) |
| Purpose | Set the charset of the document, and install the appropriate transcoder. By default, ISO-8859-1 is used.<br>The first variant names a charset explicitly.<br>The second variant will select a charset based on the given language and the browser's preferred charset (contained in the IWebRequest) |

APPENDIX A
13

| | |
|---|---|
| Other | The transcoder does not affect data written with the writeData(void*,...) methods on IWebReply. |

| Method Name | IWebHeader::language |
|---|---|
| Signatures | virtual bool language (ILanguageName& fillinLanguage) const |
| Purpose | Returns the language in the fillin if one was set. |
| Special Parameters & Return Values | Returns false if no language has been set. |

| Method Name | IWebHeader::characterSet |
|---|---|
| Signatures | virtual void characterSet (ICharacterSetName& fillinCharacterSet) const |
| Purpose | Get the character set. |
| Special Parameters & Return Values | Returns false if the character set is not set. |

| Method Name | IWebHeader::addLine |
|---|---|
| Signatures | 1. virtual void addLine (const IString& header, const IString& value) |

APPENDIX A
14

|  | 2. virtual void addLine (const IString& line) |
|---|---|
| Purpose | Add a line to the header. Any existing header field with the same name is replaced. |
| Other | 1. o Throws kInvalidParameter if header contains an illegal character (e.g. a colon or a space). See the HTTP/1.1 specification. |
| Special Parameters & Return Values | 1. header should be a HTTP or user-defined header, e.g. "X-my-header"<br>2. line should be in the form "Header: value". |

| Class Name | IAcceptLanguage |
|---|---|
| Purpose | A language/quality pair used in IWebRequest to describe languages 'accepted' by the browser. A 'quality' of 1.0 means that the browser user has 100% comprehension of that language.<br>See "http://www.w3.org/pub/WWW/Protocols/HTTP/1.1/spec.html#Accept-Language" for further details. |
| Subclassing | IAcceptLanguage is not intended to be subclassed. |
| Related Classes | IWebRequest. |
| Other | o Not Multithread or static safe. |

| Class Name | IAcceptContentType |
|---|---|
| Purpose | Describes the content types 'accepted' by the browser. A 'quality' |

APPENDIX A
15

|  | of 1.0 means that the browser most prefers that type.<br>See<br>"http://www.w3.org/pub/WWW/Protocols/HTTP/1.1/spec.html#Accept"<br>for further details. |
|---|---|
| Subclassing | IAcceptLanguage is not intended to be subclassed. |
| Related Classes | IWebRequest. |
| Other | o Not Multithread or static safe. |

| Method Name | IAcceptContentType::IAcceptContentType |
|---|---|
| Signatures | 1. IAcceptContentType ()<br>2. IAcceptContentType (const IString& majorType, const IString& minorType, double quality, const ILongLong& maxSize = 0, const IString& parameter = "")<br>3. IAcceptContentType (const IWebHeader& right) |
| Purpose | 1. Default constructor. Use with setters or assignment.<br>2. Construct with valid data.<br>3. Copy constructor. |

| Method Name | IAcceptContentType::operator == |
|---|---|
| Signatures | bool operator == (const IAcceptContentType& right) const |
| Purpose | Equality test which treats '*' in majorType and minorType as wildcards. |

APPENDIX A
16

| Method Name | IAcceptContentType::operator != |
|---|---|
| Signatures | bool operator != (const IAcceptContentType& right) const |
| Purpose | Inequality test which treats '*' in majorType and minorType as wildcards. |

| Method Name | IAcceptContentType::isSame |
|---|---|
| Signatures | bool isSame (const IAcceptContentType& right) const |
| Purpose | Equality test which does not treat '*' in majorType and minorType as wildcards. |

| Method Name | IAcceptContentType::match |
|---|---|
| Signatures | unsigned int match (const IAcceptContentType& right) const |
| Purpose | Equality test which treats '*' in majorType and minorType as wildcards, and which returns a 'strength' of match value, where 0 == no match, and higher values mean better match. |

| Method Name | IAcceptContentType::operator < |
|---|---|
| Signatures | bool operator < (const IAcceptContentType& right) const |
| Purpose | Ordered comparison based on quality only. |

| Method Name | IAcceptContentType::operator > |
|---|---|

APPENDIX A
17

| Signatures | bool operator > (const IAcceptContentType& right) const |
|---|---|
| Purpose | Ordered comparison based on quality only. |

| Class Name | IWebRequest |
|---|---|
| Purpose | Provides a canonical form for HTTP request arguments. This class is polymorphic to enable multiple, web server/platform specific implementations. IWebRequest acts as both a dictionary of HTTP request parameters and as a dictionary of user defined data. NOTE: unlike HTTP request arguments, user defined data must be specifically added via the public setter methods. |
| Subclassing | IWebRequest is intended to be subclassed but can be used as a concrete instance. As a concrete class IWebRequest acts as a specialized dictionary where all the data must first be set using the public setters. Subsequent calls using getters will return the data that was used to initialize the class instance. Subclasses of IWebRequest are free to determine the method used to get the data that will be returned to the caller. For example, ICGIRequest will retrieve data using envirnment variable whereas INSAPIRequest will use the protocol defined by NSAPI. |
| Related Classes | Developers should understand IURL, IAcceptLanguage, and IAcceptContentType. |
| Other | o Not Multithread or static safe. |

| Enum | IWebRequest::EMethod |
|---|---|

APPENDIX A
18

| Purpose | This enum lists the HTTP method used to invoke this request. |
|---|---|
| kGet | See section 8.2 GET in HTTP 1.1 spec. "Standard" method. |
| kPost | See section 8.4 POST in HTTP 1.1 spec. "Standard" method. |
| kHead | See section 8.3 HEAD in HTTP 1.1 spec. "Standard" method. |
| kPut | See section 8.5 PUT in HTTP 1.1 spec. |
| kDelete | See section 8.9 DELETE in HTTP 1.1 spec. |
| kPatch | See section 8.6 PATCH in HTTP 1.1 spec. |
| kCopy | See section 8.7 COPY in HTTP 1.1 spec. |
| kMove | See section 8.8 MOVE in HTTP 1.1 spec. |
| kLink | See section 8.10 LINK in HTTP 1.1 spec. |
| kUnlink | See section 8.11 UNLINK in HTTP 1.1 spec. |
| kTrace | See section 8.12 TRACE in HTTP 1.1 spec. |
| kWrapped | See section 8.13 WRAPPED in HTTP 1.1 spec. |

APPENDIX A
19

| | |
|---|---|
| kUnknown | Placeholder for all other methods. |

| Enum | IWebRequest::EKey |
|---|---|
| Purpose | This enum lists the keys which are considered portable (i.e. available on all servers/platforms). Programs which want to maximize portability should use only these keys to call member, value and setValue.<br><br>Many of the keys listed below reference either the CGI 1.1 specification (http://www.ast.cam.ac.uk/~drtr/cgi-spec.html) or the HTTP 1.1 specification (http://www.w3.org/pub/WWW/Protocols/HTTP/1.1/spec.html) in describing the values accessed using that key. |
| kURL | See url(). |
| kAdapterPath | See adapterPath(). |
| kRelativePath | See relativePath(). |
| kQuery | See query(). |
| kMethod | See method(). |
| kContentTypeAccepted | See isContentTypeAccepted(). See also Accept in HTTP spec. |
| kLanguageAccepted | See language(). See also Accept-Language in HTTP |

APPENDIX A
20

| | spec. |
|---|---|
| kCharacterSetAccepted | See characterSet(). See also Accept-Charset in HTTP spec. |
| kAuthenticationType | See AUTH_TYPE in CGI spec. |
| kRemoteAddress | See REMOTE_ADDR in CGI spec. |
| kRemoteHost | See REMOTE_HOST in CGI spec. |
| kRemoteUser | See REMOTE_USER in CGI spec. |
| kInputContentType | See CONTENT_TYPE in CGI spec. |
| kInputContentLength | See CONTENT_LENGTH in CGI spec. |
| kQueryString | See QUERY_STRING in CGI spec. |
| kEncodingAccepted | See Accept-Encoding in HTTP spec. |
| kUserAgent | See User-Agent in HTTP spec. |
| kAdapterName | See SCRIPT_NAME in CGI spec. |
| kServerName | See SERVER_NAME in CGI spec. |
| kServerPort | See SERVER_PORT in CGI spec. |

APPENDIX A
21

| kServerProtocol | See SERVER_PROTOCOL in CGI spec. |
|---|---|
| kServerSoftware | See SERVER_SOFTWARE in CGI spec. |

| Method Name | IWebRequest::adapterPath |
|---|---|
| Signatures | virtual const IURL& adapterPath () const |
| Purpose | return a url in which the last component of the path is the adapter name (kAdapterName). For example, if the script is a CGI script called foo.exe', the full url might contain the' following path:<br>/dir1/cgi-bin/foo.exe/dir2/file1<br>In this case, this function would return the following path:<br>/dir1/cgi-bin/foo.exe/ |

| Method Name | IWebRequest::inputData |
|---|---|
| Signatures | virtual unsigned long inputData (void*& fillinPointer) const |
| Purpose | Allows the caller to access to the input data, which in general, will contain the data from a "post" request. Clients should rarely, if ever, need to use this method as the "query" method returns the query data from either the URL or post data. |
| Other | Multiple calls to this method will return the same count and a pointer to the same data unless a call to setInputData(...) is made. |
| Special Parameters & Return Values | The storage for the data pointed to by fillinPointer is owned by IWebRequest and should not be deleted.<br>the returned unsigned long is the number of bytes that are valid to |

APPENDIX A
22

| | access via the pointer returned in fillinPointer. |
|---|---|

| Method Name | IWebRequest::url |
|---|---|
| Signatures | virtual const IURL& url () const; |
| Purpose | Return the complete URL that is associated with this request object. In general the url is the same as the url used to access the request handler. |

| Method Name | IWebRequest::query |
|---|---|
| Signatures | virtual const IURL& query () const; |
| Purpose | Return a url that contains the query data. The query data can come from either the input url or the post data. It is recommended that clients use this function to access all query data instead of using "inputData" and the "url" methods. |

| Method Name | IWebRequest::internalInputData |
|---|---|
| Signatures | virtual unsigned long internalInputData (void*& fillinPointer) const |
| Purpose | subclass interface to implement the definition defined by IWebRequest::inputData(). See IWebRequest::inputData for a |

APPENDIX A
23

|   | detailed description. |
|---|---|
| Other | |
| Special Parameters & Return Values | The storage for the data pointed to by fillinPointer is owned by IWebRequest subclass, and will not be deleted by any other code. the returned unsigned long is the number of bytes that are valid to access via the pointer returned in fillinPointer. |

| Method Name | IWebRequest::relativePath |
|---|---|
| Signatures | virtual const IURL& relativePath () const |
| Purpose | Return a URL that contains only the relative path of the URL associated with the IWebRequest. The relative path is the first component of the path that follows the program name (kProgramName). For example, if the script is a CGI script called foo.exe, the full url might contain the following path:<br>/dir1/cgi-bin/foo.exe/dir2/file1<br>In this case, this function would return the following path:<br>dir2/file1 |

| Method Name | IWebRequest::remove |
|---|---|
| Signatures | virtual bool remove (const IString& name) |
| Purpose | The purpose of this method is to remove a user defined key/value pair from the IWebRequest. |

APPENDIX A
24

| Method Name | IWebRequest::isContentTypeAccepted |
|---|---|
| Signatures | 1. virtual bool isContentTypeAccepted (const IString& major, const IString& minor) const;<br>2. virtual bool isContentTypeAccepted (const IString& major, const IString& minor, const IString& parameter) const;<br>3. virtual bool isContentTypeAccepted (const IString& major, const IString& minor, IAcceptContentType& fillinType) const;<br>4. virtual bool isContentTypeAccepted (const IString& major, const IString& minor, const IString& parameter, IAcceptContentType& fillinType) const; |
| Purpose | Determine if a given content type has been requested. For example to determine if documents of type text/html have been requested, call thi method with major = "text", minor = "html".<br>All versions of this function accept "*" as a wildcard for either/both major or minor types |
| Special Parameters & Return Values | 1. Returns true if the major and minor language elements have been requested. Otherwise, false is returned.<br>2. Same as 1 but additionally requires that 'parameter' matches.<br>3. Same as 1 and returns the full type matched.<br>4. Same as 2 and returns the full type matched. |

| Method Name | IWebRequest::contentTypeCount |
|---|---|
| Signatures | virtual unsigned long contentTypeCount () const |
| Purpose | Return the number of content types accepted by this request. In the event that no types have been specified, this function will return zero (which should be interpreted as all types are acceptable). |

APPENDIX A
25

| Method Name | IWebRequest::contentType |
|---|---|
| Signatures | virtual bool contentType (unsigned long ranking, IAcceptContentType& fillinType) const |
| Purpose | Return the content type with the specified ranking, where 'ranking' is a contiguous set starting from zero. If 'ranking' is out of range, this function does nothing and returns false, otherwise it assigns to 'fillinType' and returns true. In the event that no types have been specified, this function will return false for all rankings.. |

| Method Name | IWebRequest::isLanguageAccepted |
|---|---|
| Signatures | virtual bool isLanguageAccepted (const ILanguageName& language, unsigned short& fillinRanking) const; |
| Purpose | Check if a particular language can be accepted by the browser. Returns true if language is present in the list of accepted languages, false otherwise. If present, "ranking" is set and can be used when there are a number of possible languages that can be output (first choice == 0). In the event that no languages have been specified, *all* calls to this function will return true and assign a zero ranking. |

| Method Name | IWebRequest::languageCount |
|---|---|
| Signatures | virtual unsigned long languageCount () const |
| Purpose | Return the number of languages accepted by this request. In the event that no languages have been specified, this function will return zero (which should be interpreted as *all* languages are acceptable) |

APPENDIX A
26

| Method Name | IWebRequest::language |
|---|---|
| Signatures | virtual bool language (unsigned long ranking, IAcceptLanguage& fillinLanguage) |
| Purpose | Return the language with the specified ranking, where 'ranking' is a contiguous set starting from zero. If 'ranking' is out of range, this function does nothing and returns false, otherwise it assigns to 'fillinLanguage' and returns true. In the event that no languages have been specified, this function will return false for *all* rankings.. |

| Method Name | IWebRequest::isCharacterSetAccepted |
|---|---|
| Signatures | virtual bool isCharacterSetAccepted (const ICharacterSetName& characterSet, unsigned short& fillinRanking) const; |
| Purpose | Check if a particular character set can be accepted by the browser. Returns true if characterSet is present in the list of accepted languages, false otherwise. If present, 'ranking' is set and can be used when there are a number of possible character sets that can be output (first choice == 0). In the event that no character sets have been specified, *all* calls to this function will return true and assign a zero ranking. |

| Method Name | IWebRequest::characterSetCount |
|---|---|
| Signatures | virtual unsigned long characterSetCount () const |
| Purpose | Return the number of character sets accepted by this request. In the event that no character sets have been specified, this function will |

APPENDIX A
27

|  | return zero (which should be interpreted as *all* character sets are acceptable). |
|---|---|

| Method Name | IWebRequest::characterSet |
|---|---|
| Signatures | virtual bool characterSet (unsigned short ranking, ICharacterSetName& fillinCharacterSet) const; |
| Purpose | Return the character set with the specified ranking, where "ranking" is a contiguous set starting from zero. If 'ranking' is out of range, this function does nothing and returns false, otherwise it assigns to "fillinCharacterSet" and returns true. In the event that no character sets have been specified, this function will return false for *all* rankings. |

| Method Name | IWebRequest::isEncodingAccepted |
|---|---|
| Signatures | virtual bool isEncodingAccepted (const IEncodingName& encoding, unsigned short& fillinRanking) const; |
| Purpose | Check if a particular encoding can be accepted by the browser. Returns true if encoding is present in the list of accepted encodings, false otherwise. If present, 'ranking' is set and can be used when there are a number of possible encodings that can be output (first choice == 0). In the event that no encodings have been specified, *all* calls to this function will return true and assign a zero ranking. |

| Method Name | IWebRequest::encoding |
|---|---|
| Signatures | virtual bool characterSet |

APPENDIX A
28

|  | (unsigned long ranking, IEncodingName& fillinEncoding) const; |
|---|---|
| Purpose | Return the encoding with the specified ranking, where "ranking" is a contiguous set starting from zero. If 'ranking' is out of range, this function does nothing and returns false, otherwise it assigns to "fillinEncoding" and returns true. In the event that no encodings have been specified, this function will return false for *all* rankings. |

| Method Name | IWebRequest::value |
|---|---|
| Signatures | 1. virtual bool value (EKey key, IString& fillinValue) const;<br>2. virtual bool value (const IString& name, IString& fillinValue) const; |
| Purpose | 1. If the value associated with EKey is not an empty string then fillinValue will be set and true will be returned, otherwise, false is returned.<br>For a definition of EKey please see Enum table "IWebRequest::EKey"<br>2. If the key "name" is found then fillinValue will be set and true will be returned, otherwise, false is returned. |
| Special Parameters & Return Values | 1. NOTE: true will always be returned unless the value has been forced to an empty string. |

| Method Name | IWebRequest::setValue |
|---|---|
| Signatures | 1. virtual void setValue (EKey key, const IString& value);<br>2. virtual void setValue (const IString& name, const IString& value); |

APPENDIX A
29

| Purpose | 1. sets the value associated with EKey to the value passed in. |
|---|---|
| | For a definition of EKey please see Enum table "IWebRequest::EKey" |
| | If the key exists then replaces the value with the new value passed in. |
| | 2. If the key does not exist, creates a new key and value and sets their respective values to the parameters passed in. |

| Class Name | IWebReply |
|---|---|
| Purpose | Provides a canonical form for HTTP reply. IWebReply provides the functionality needed to produce an HTTP stream that can be read by a web browser. IMWebRequestHandler subclasses must write their data to an instance of IWebReply. |
| Subclassing | IWebReply must be subclassed. Subclasses are responsible for overriding the method "internalWrite". It is the subclasses that tie IWebReply to something useful. For example, IStandardOutReply ties the IWebReply to stdout. |
| Related Classes | Developers should understand IString and IText. Although not required for use, developers may wish to have an understanding of IWebFilter, ICharacterSetName, IWebHeader, ILangauge, and IURL. |
| Other | o IWebReply is an abstract class and cannot be instantiated.<br>o IWebReply can only be allocated on the stack.<br>o Not Multithread or static safe. |

| Method Name | IWebReply::internalWrite |
|---|---|
| Signatures | virtual void internalWrite (void* out, unsigned long length) = 0 |

APPENDIX A
30

| Purpose | IWebReply uses this protected method to send all data to wherever the subclass has defined. In general, all data sent through this method should be sent back to the web browser that is making the request. For example, IStandardOutReply's internalWrite stores the data pointed to by "out" into stdout. |
|---|---|
| Other | NOTE: The data sent to internalWrite has been preprocessed and transcoded as needed before the call is made. |
| Special Parameters & Return Values | length = number of bytes to write<br>out = pointer to a buffer that contains the data to be written. |

| Method Name | IWebReply::new,delete |
|---|---|
| Signatures | static void* operator new (size_t size)<br>static void operator delete (void* pointer); |
| Purpose | Operator new and delete were made private methods in order to force IWebReply subclasses to be created on the stack only. |

| Method Name | IWebReply::outputBegun |
|---|---|
| Signatures | virtual bool outputBegun () const |
| Purpose | This function will return false until the first call to one of the output functions, true thereafter... Once output has begun certain operations on IWebReply are no longer valid. For example, setHeader can be called as many times as the client likes as long as outputBegun returns false. Once output has begun, and the header written, setting the header is an invalid operation. |

APPENDIX A
31

| Method Name | IWebReply::redirect |
|---|---|
| Signatures | virtual void redirect (const IURL& newLocation) |
| Purpose | This function can be used to redirect the request to a new location. If this function is called when outputBegun() == true, an exception will be thrown... |
| Special Parameters & Return Values | The IURL should contain the new location that the browser should go to when this request has completed. |

| Method Name | IWebReply::write |
|---|---|
| Signatures | virtual void write (char out, EFilter = kNoFilter)<br>virtual void write (const char* out, EFilter = kNoFilter)<br>virtual void write (const char* out, unsigned long length, EFilter = kNoFilter)<br>virtual void write (const IString& out, EFilter = kNoFilter)<br>virtual void write (const IText& out, EFilter = kNoFilter)<br>virtual void write (void* out, unsigned long length) |
| Purpose | Provide an output function over several different types, and optionally provide filtering as needed. The purpose of the filter is to allow data written via the write calls to be encoded as needed for the consumer of the data. For example, the IHTMLFilter will encode the output data i a format that is suitable for display and will not be falsely interpreted as a HTML tag. |
| Special Parameters & Return Values | The following enum is used on all of the output functions to control whether or not the filter (see setFilter(...)) is used...<br>enum EFilter |

APPENDIX A
32

|  | { <br>     kNoFilter, <br>     kFilter <br> } ; |
|---|---|

| Class Name | IWebFilter |
|---|---|
| Purpose | A filter which can be applied to web reply output. |
| Subclassing | IWebFilter defines protocol only and therefore must be subclassed. Although the format of the web filter is generic, it's purpose in the context of the WebWorks project is specific. The web filter subclass is used by an instance of an IWebReply class to optionally process data before it is written. For example, the IHTMLFilter will convert special characters into escaped sequences to prevent user data from being interpreted as HTML tags. |
| Related Classes | IString and IText |
| Other | o IWebFilter is an abstract class and cannot be instantiated. <br> o Multithread-safe but not static safe. |

| Method Name | IWebFilter::encode |
|---|---|
| Signatures | 1. virtual void encode (const IString& in, IString& out) const; <br> 2. virtual void encode (const IText& in, IText& out) const = 0; |
| Purpose | These methods define the protocal of a generic encoding mechanism. The input string( "in") should be encoded and the results stored in the |

APPENDIX A
33

|  | "out" string.<br><br>1. This version of the encode funtion is implemented in the base class by using the IText version of the function. This is very inefficient and therefore clients should consider providing implimentations for all versions of encode. |
|---|---|

| Class Name | IHTMLFilter |
|---|---|
| Purpose | The HTMLFilter is a concrete subclass of IWebFilter. It's purpose is to escape illegal characters that should not appear in normal text. The reason the characters are escaped is to avoid misinterpretation of user data. For example, if the user is trying to display:<br>This is an example of an HTML tag: <BR><br>the "<BR>" part of the text would be interpreted as a break and would not be displayed. To fix this problem the IHTMLFilter will escape the "<" and ">" characters. The resulting string will look like this:<br>This is an example of an HTML tag: <BR> |
| Subclassing | Should not be subclassed |
| Related Classes | IString and IText |
| Other | o Multithread-safe but not static safe. |

| Method Name | IHTMLFilter::encode |
|---|---|
| Signatures | virtual void encode (const IString& in, IString& out) const<br>virtual void encode (const IText& in, IText& out) const |
| Purpose | The encoding functions transform text into a form that can be viewed |

APPENDIX A
34

|  | by a browser. Specifically, any data that may be interpreted as HTML code will be "escaped", thus causing the browser to display correctly. For example, all "<" will be escaped when processed by this filter. |
|---|---|

| Method Name | IHTMLFilter::decode |
|---|---|
| Signatures | virtual void decode (const IString& in, IString& out) const<br>virtual void decode (const IText& in, IText& out) const |
| Purpose | The complement to encode, these methods will decode data that has previously been encoded. |

What is claimed is:

1. A method of processing a service request in an adapter executed by a computer, comprising the steps of:
    (a) receiving the service request into a memory of the computer;
    (b) identifying a type of interface from among a plurality of different interfaces based on the service request, wherein the interface connects the adapter to a server;
    (c) creating request and reply objects in the memory of the computer from a request subclass selected from a request class based on the identified interface and from a reply subclass selected from a reply class based on the identified interface, wherein the classes provide templates for processing requests and replies, and the subclasses handle specific functions of the different interfaces;
    (d) creating a handler object in the memory of the computer from a handler subclass selected from a handler class based on the identified interface;
    (e) executing the handler object in the memory of the computer, wherein the handler object accesses the service request using the request object, processes the service request, generates output in response to the service request, provides access to the generated output via the reply object, and passes control to the adapter for replying to the service request; and
    (f) replying to the service request using the generated output accessed via the reply object passed from the handler.

2. The method of claim 1 above, wherein the interface is selected from a group comprising a Common Gateway Interface, a Netscape Server Application Programming Interface, and an Internet Connection Server Application Programming Interface.

3. The method of claim 1 above, further comprising the step of passing request and reply objects to a plurality of different handler objects.

4. The method of claim 1 above, wherein the handler object is statically linked to the adapter.

5. The method of claim 1 above, wherein the handler object is dynamically linked to the adapter.

6. The method of claim 5 above, further comprising the steps of retrieving an object reference from the request and creating the handler object in the memory of the computer using the object reference.

7. The method of claim 1 above, wherein the handler object is persistent.

8. The method of claim 1 above, wherein the handler object executes remotely from the adapter.

9. An apparatus for processing a service request in a computer, comprising:
    an adapter being executed by the computer;
    the adapter comprising means for receiving the service request into a memory of the computer, for identifying a type of interface from among a plurality of different interfaces based on the service request, for creating a request object in the memory of the computer from a request subclass selected from a request class based on the identified interface to access the service request, for creating a reply object in the memory of the computer from a reply subclass selected from a reply class based on the identified interface to access a response to the service request, for creating a handler object in the memory of the computer from a handler subclass selected from a handler class based on the identified interface, for initiating execution of the handler object by the computer, for transferring control to the handler object for processing of the service request, wherein the interface connects the adapter to a server, the classes provide templates for processing requests and replies, and the subclasses handle specific functions of the different interfaces,
    the handler object comprising means for accessing the service request via the request object, for processing the service request and for generating output in the memory of the computer in response thereto, for providing access to the generated output using the reply object, and for passing control to the adapter for responding to the service request, and
    the adapter comprising means for receiving control from the handler object and for replying to the service request in response thereto using the generated output accessed via the reply object passed from the handler.

10. The apparatus of claim 9, wherein the interface is selected from a group comprising a Common Gateway Interface, a Netscape Server Application Programming Interface, and an Internet Connection Server Application Programming Interface.

11. The apparatus of claim 9, wherein the adapter further comprises means for passing request and reply objects to a plurality of different handler objects.

12. The apparatus of claim 9, wherein the handler object is statically linked to the adapter.

13. The apparatus of claim 9, wherein the handler object is dynamically linked to the adapter.

14. The apparatus of claim 9, wherein the adapter further comprises means for retrieving an object reference from the request and means for creating the handler object in the memory of the computer using the object reference.

15. The apparatus of claim 9, wherein the handler object is persistent.

16. The apparatus of claim 9, wherein the handler object executes remotely from the adapter.

17. An article of manufacture comprising a program storage medium readable by a computer having a memory, the medium tangibly embodying one or more programs of instructions executable by the computer to perform method steps for processing a service request in an adapter executed by a computer, the method comprising the steps of:
    (a) receiving the service request into a memory of the computer;
    (b) identifying a type of interface from among a plurality of different interfaces based on the service request, wherein the interface connects the adapter to a server;
    (c) creating request and reply objects in the memory of the computer from a request subclass selected from a request class based on the identified interface and from a reply subclass selected from a reply class based on the identified interface, wherein the classes provide templates for processing requests and replies, and the subclasses handle specific functions of the different interfaces;
    (d) creating a handler object in the memory of the computer from a handler subclass selected from a handler class based on the identified interface;
    (e) executing the handler object in the memory of the computer, wherein the handler object accesses the service request using the request object, processes the service request, generates output in response to the service request, provides access to the generated output via the reply object, and passes control to the adapter for replying to the service request; and (f) replying to the service request using the generated output accessed via the reply object passed from the handler.

18. The article of manufacture of claim 17, wherein the interface is selected from a group comprising a Common Gateway Interface, a Netscape Server Application Programming Interface, and an Internet Connection Server Application Programming Interface.

19. The article of manufacture of claim 17, wherein the method further comprises the step of passing request and reply objects to a plurality of different handler objects.

20. The article of manufacture of claim 17, wherein the handler object is statically linked to the adapter.

21. The article of manufacture of claim 17, wherein the handler object is dynamically linked to the adapter.

22. The article of manufacture of claim 17, wherein the method further comprises the steps of retrieving an object reference from the request and creating the handler object in the memory of the computer using the object reference.

23. The article of manufacture of claim 17, wherein the handler object is persistent.

24. The article of manufacture of claim 17, wherein the handler object executes remotely from the adapter.

25. A method of processing a service request in a handler object executed by a computer, comprising the steps of:
  (a) accessing the service request via a request object created in a memory of the computer from a request subclass selected from a request class by an adapter based on a type of interface identified from among a plurality of different interfaces based on the service request, wherein the class provides a template for processing requests, the subclasses handle specific functions of the different interfaces, and the interface connects the adapter to a server;
  (b) processing the service request in the memory of the computer;
  (c) generating output in the memory of the computer in response to the processed service request;
  (d) providing access to the generated output via a reply object created in the memory of the computer from a reply subclass selected from a reply class by the adapter based on a type of interface identified from among a plurality of different interfaces based on the service request, wherein the class provides a template for processing replies, and the subclasses handle specific functions of the different interfaces; and
  (e) passing control to the adapter for replying to the service request, wherein the adapter replies to the service request using the generated output accessed via the reply object passed from the handler object.

26. The method of claim 25 above, further comprising the step of providing international text support for the generated output.

27. The method of claim 26 above, wherein the step of providing international text support for the generated output comprises the steps of:
  setting a language indicator in the reply object;
  setting a character set indicator in the reply object;
  generating the output for the request by translating text using a character set corresponding to the character set indicators.

28. The method of claim 25, wherein the interface is selected from a group comprising a Common Gateway Interface, a Netscape Server Application Programming Interface, and an Internet Connection Server Application Programming Interface.

29. The method of claim 25, wherein the handler object is statically linked to the adapter.

30. The method of claim 25, wherein the handler object is dynamically linked to the adapter.

31. The method of claim 25, wherein the handler object is persistent.

32. The method of claim 25, wherein the handler object executes remotely from the adapter.

33. An apparatus for processing a service request in a handler object executed by a computer, comprising:
  a handler object being executed by the computer, wherein the handler object is created in the memory of the computer from a handler subclass selected from a handler class based on a type of interface identified from among a plurality of different interfaces, and the interface connects an adapter to a server;
  the handler object comprising means for accessing the service request via a request object created in a memory of the computer from a request subclass selected from a request class by the adapter based on the identified interface, means for processing the service request in the memory of the computer, means for generating output in the memory of the computer in response to the processed service request, means for providing access to the generated output via a reply object created in the memory of the computer from a reply subclass selected from a reply class by the adapter based on the identified interface, and means for passing control to the adapter for replying to the service request, wherein the adapter replies to the service request using the generated output accessed via the reply object passed from the handler object and wherein the classes provide templates for processing requests and replies, and the subclasses handle specific functions of the different interfaces.

34. The apparatus of claim 33, wherein the interface is selected from a group comprising a Common Gateway Interface, a Netscape Server Application Programming Interface, and an Internet Connection Server Application Programming Interface.

35. The apparatus of claim 33, wherein the handler object is statically linked to the adapter.

36. The apparatus of claim 33, wherein the handler object is dynamically linked to the adapter.

37. The apparatus of claim 33, wherein the handler object is persistent.

38. The apparatus of claim 33, wherein the handler object executes remotely from the adapter.

39. An article of manufacture comprising a program storage medium readable by a computer having a memory, the medium tangibly embodying one or more programs of instructions executable by the computer to perform method steps for processing a service request in a handler object executed by a computer, wherein the handler object is created in the memory of the computer in accordance with a type of interface identified from among a plurality of different interfaces, and wherein the interface connects an adapter to a server, the method comprising the steps of:
  (a) accessing the service request via a request object created in a memory of the computer from a request subclass selected from a request class by the adapter based on the identified interface, wherein the class provides a template for processing requests and the subclasses handle specific functions of the different interfaces;
  (b) processing the service request in the memory of the computer;
  (c) generating output in the memory of the computer in response to the processed service request;

(d) providing access to the generated output via a reply object created in the memory of the computer from a reply subclass selected from a reply class by the adapter based on the identified interface, wherein the class provides a template for processing replies and the subclasses handle specific functions of the different interfaces; and (e) passing control to the adapter for replying to the service request, wherein the adapter replies to the service request using the generated output accessed via the reply object passed from the handler object.

40. The article of manufacture of claim 39, wherein the interface is selected from a group comprising a Common Gateway Interface, a Netscape Server Application Programming Interface, and an Internet Connection Server Application Programming Interface.

41. The article of manufacture of claim 39, wherein the handler object is statically linked to the adapter.

42. The article of manufacture of claim 39, wherein the handler object is dynamically linked to the adapter.

43. The article of manufacture of claim 39, wherein the handler object is persistent.

44. The article of manufacture of claim 39, wherein the handler object executes remotely from the adapter.

\* \* \* \* \*